(No Model.) 2 Sheets—Sheet 1.

W. MALAM.
CAR WHEEL AND AXLE.

No. 329,180. Patented Oct. 27, 1885.

Witnesses:
Harry Drury
John E. Parker

Inventor:
W. Malam
by his Attorneys
Howson & Sons (No Model.) 2 Sheets—Sheet 2.
W. MALAM.
CAR WHEEL AND AXLE.
No. 329,180. Patented Oct. 27, 1885.
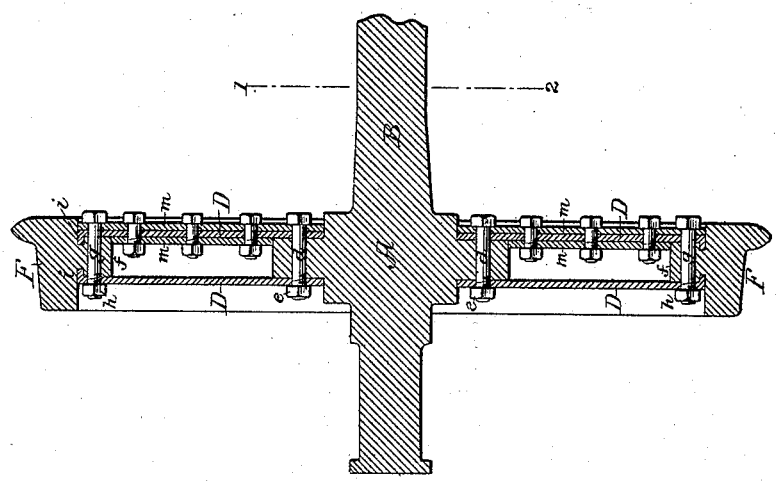
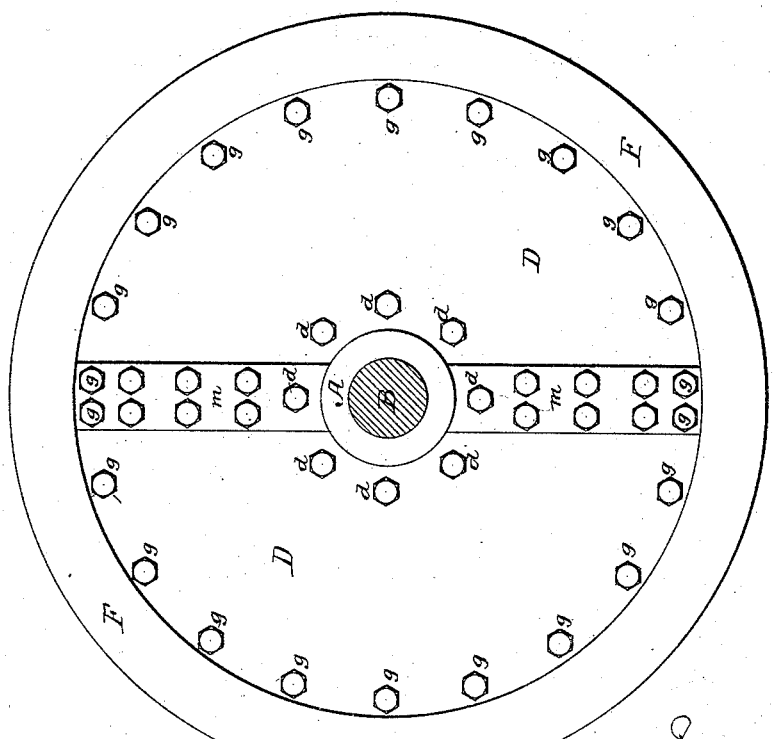
Witnesses:
John E. Parker
Harry Drury
Inventor:
William Malam
by his Attorneys
Howson & Sons

UNITED STATES PATENT OFFICE.

WILLIAM MALAM, OF EDGE MOOR, DELAWARE.

CAR WHEEL AND AXLE.

SPECIFICATION forming part of Letters Patent No. 329,180, dated October 27, 1885.

Application filed August 3, 1885. Serial No. 173,365. (No model.)

*To all whom it may concern:*

Be it known that I, WILLIAM MALAM, a subject of the Queen of Great Britain and Ireland, and a resident of Edge Moor, Delaware, have invented certain Improvements in Combined Wheels and Axles for Railroad-Cars, &c., of which the following is a specification.

The object of my invention is to so construct a wheel and axle for railroad cars and locomotives that the injurious strains upon the wheel caused by too tight a fit of the hub of the same upon the axle are prevented, and, on the other hand, the dangers arising from too loose a fit of the wheel upon the axle are avoided. This object I attain by forming the hub of the wheel integral with the axle, and securing the body of the wheel to said hub, as fully set forth hereinafter.

Figure 2:
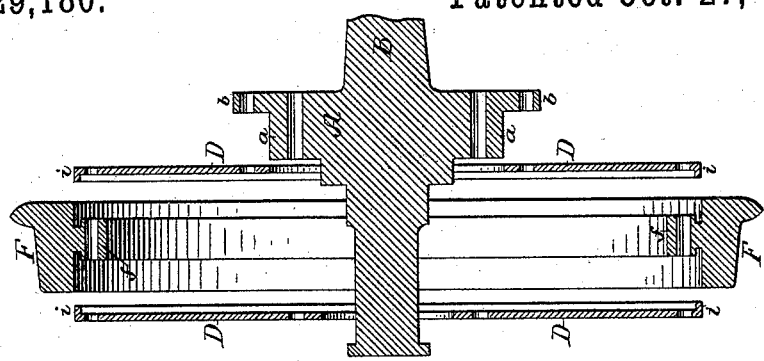
Figure 1:
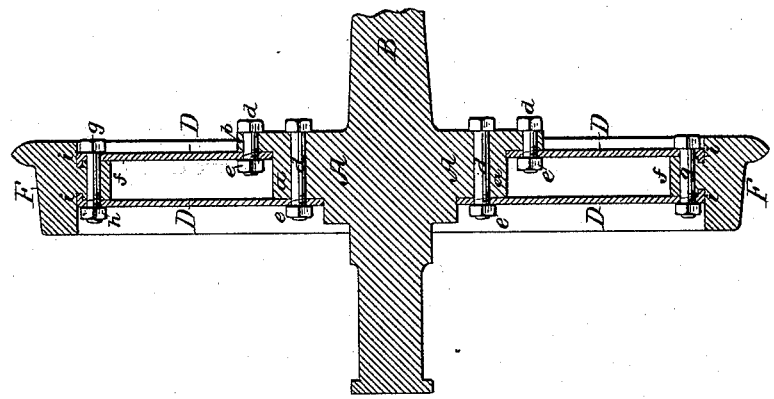
Figure 3:
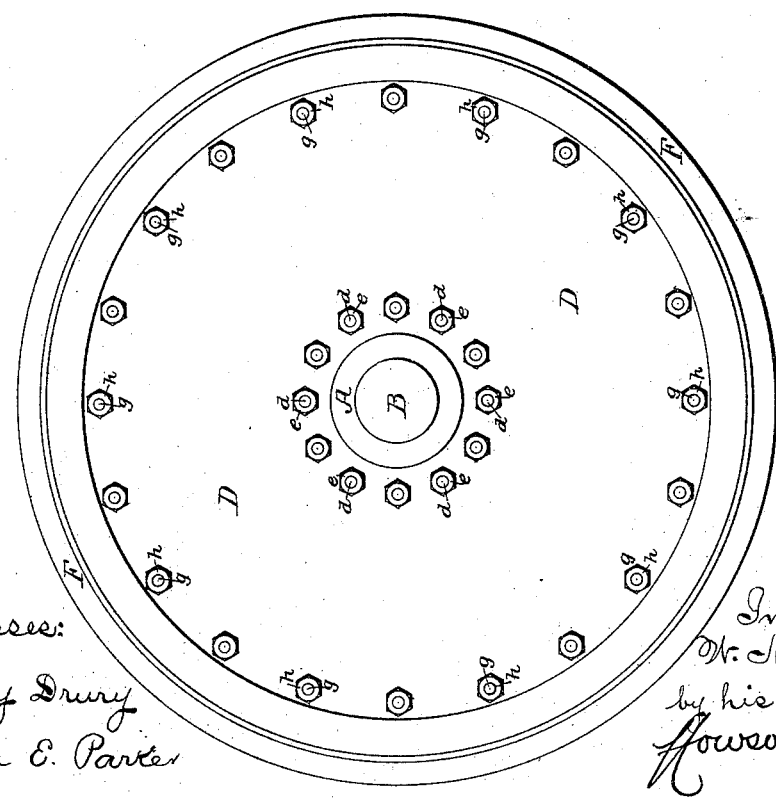

In the accompanying drawings, Figure 1 is a longitudinal section of a car-wheel and part of the axle constructed in accordance with my invention; Fig. 2, a similar view showing the parts of the wheel separated; Fig. 3, a face view of the wheel looking from the end of the axle; Fig. 4, a sectional view of a modified form of wheel and axle; and Fig. 5, a section on the line 1 2, Fig. 4.

Objections to railroad-car wheels as usually constructed are the undue straining of the wheel, owing to too tight a fit of the hub of the same upon its seat on the axle, or, on the other hand, the danger incident to too loose a fit of the wheel on the axle. With the view of overcoming these objections I forge or otherwise form the hub A of the wheel upon and integral with the axle B, and secure to said hub the inner portion of the body of the wheel by bolting or riveting the same thereto, the tire being bolted or riveted to the outer portion of said body. As shown in Figs. 1 and 2, the hub has a flange comprising two portions, *a* and *b*, said portion *a* being less in diameter than the portion *b*, and both portions presenting annular seats facing outward and adapted for the reception of the central portions of the inner and outer annular plates, D D, which form the body of the wheel, these plates being securely bolted to the respective portions of the flange by means of transverse bolts *d*, provided with suitable nuts, *e*.

The tire F of the wheel has an inwardly-projecting rib, *f*, which fits between the outer portions of the annular plates D, and is secured thereto by means of transverse bolts *g* and nuts *h*, further security being assured by forming on each of said plates D an inwardly-projecting annular flange, *i*, adapted to an annular groove formed in the rib *f* at the base of the same—that is to say, at the point where it joins the body of the tire.

It will be evident that when the wheel and axle are constructed in this manner the structure possesses much greater strength and rigidity than when the wheel is made separate from the axle and forcibly driven onto the same as usual, and, furthermore, that the objections before referred to as incident to the use of such separately-made wheels are effectually overcome.

As each of the plates D forming the body of the wheel is a continuous annular plate, and the diameter of the hub is necessarily greater than the central openings of said annular plates, it is impossible to fit the inner plate to the inner side of the hub, as in making an ordinary car-wheel; hence the formation on the hub of the two outwardly-facing seats for said plates D, and the making of the central opening of the inner plate larger in diameter than that of the outer plate, so that it can be passed over the portion *a* of the flange forming the seat for said outer plate. This construction can, however, be modified by making the inner plate in sections. For instance, in Figs. 3 and 4 I have shown the hub A as having a projection or flange, to the opposite faces of which the inner and outer plates forming the body of the wheel are bolted, the inner plate being made in two semicircular sections, which, after they have been applied to the axle inside the hub, are securely connected together by means of inner and outer splice-bars, *m*, the plate being then applied and secured to the hub and tire.

If desired, the body of the wheel may consist of a single web of proper strength, instead of two plates, as shown; but the latter construction is preferred.

I claim as my invention—

1. An axle having a wheel-hub integral therewith, said hub having a projecting flange presenting two seats for the reception of the central portions of inner and outer plates constituting the body of a car-wheel, all substantially as specified.

2. The combination of an axle having a wheel-hub formed integral therewith, and presenting a projecting flange, with a body-plate having a bearing against the seat formed by said flange, and with bolts, whereby the plate is secured to the flange, all substantially as set forth.

3. The axle having a wheel-hub formed integral therewith, and presenting two outwardly-facing seats for the reception of the inner portion of the wheel-body, as specified.

4. The combination of the axle having a wheel-hub formed integral therewith, and presenting two outwardly-facing seats, as described, with the wheel, the body of which consists of annular plates adapted to said outwardly-facing seats, as specified.

In testimony whereof I have signed my name to this specification in the presence of two subscribing witnesses.

WILLIAM MALAM.

Witnesses:
GEO. C. WARD,
D. CONNELL.